United States Patent Office 3,222,422
Patented Dec. 7, 1965

3,222,422
BLEND OF A DIENE RUBBER-BASED GRAFT CO-POLYMER, AN EMULSION-POLYMERIZED STYRENE-ACRYLONITRILE TYPE INTERPOLYMER, AND A SUSPENSION-POLYMERIZED STYRENE-ACRYLONITRILE TYPE INTERPOLYMER
Lester A. Cohen, Springfield, Mass., assignor to Monsanto Chemical Company, St. Louis, Mo., a corporation of Delaware
No Drawing. Filed Sept. 21, 1961, Ser. No. 139,624
8 Claims. (Cl. 260—876)

This invention relates to polyblends and more particularly relates to improved polyblends comprising styrene-acrylonitrile type interpolymers and certain diene rubber-based graft copolymers.

An object of the invention is to provide novel polyblends.

Another object is to provide improved polyblends comprising styrene-acrylonitrile type interpolymers and certain diene rubber-based graft copolymers.

A further object is to provide methods of preparing such polyblends.

These and other objects are attained by mixing latices of a monovinylidene aromatic compound-unsaturated nitrile superstrate/diene rubber substrate graft copolymer and a monovinylidene aromatic compound-unsaturated nitrile interpolymer, recovering the polymers from the mixed latices to form a sub-blend, and blending this sub-blend with a monovinylidene aromatic compound-unsaturated nitrile bead interpolymer, as hereinafter more completely described.

The following examples are given to illustrate the invention. Unless otherwise specified, quantities are mentioned on a weight basis.

EXAMPLE I.—PREPARATION OF GRAFT COPOLYMER

Part A

Prepare a rubber latex from the following polymerization recipe:

| Component: | Parts |
|---|---|
| Water | 200 |
| Butadiene | 90 |
| Styrene | 10 |
| Divinylbenzene | 0.625 |
| Sodium stearate | 5 |
| t-Dodecyl mercaptan | 0.4 |
| Potassium persulfate | 0.3 |

Charge the water and soap to a suitable reaction vessel, deoxygenate the soap solution by boiling, cool under nitrogen, add the remaining components of the recipe, and heat with agitation at 58° C. to 92% conversion of monomers to polymer. The butadiene-styrene copolymer has a gel content of 93% and a swelling index of 14 in benzene.

Part B

Prepare a graft copolymer latex by (1) adding 0.15 part of potassium persulfate and 50 parts of water to an aliquot of the latex of Part A containing 100 parts of rubber solids, (2) heating the reaction mixture to 60° C. with agitation, (3) adding 50 parts of an 80:20 mixture of styrene and acrylonitrile to the reaction mixture over a period of 1.5 hours, and (4) maintaining the reaction mixture at 60° C. under agitation until substantially all of the monomer mixture has polymerized. Stabilize the latex by adding 3 parts of a 2:1 mixture of di-t-butyl-p-cresol and tris(nonylphenyl)-phosphite thereto.

More than 80% of the polymerized styrene-acrylonitrile is chemically-combined with the rubber substrate of the graft copolymer, as evidenced by the inability of this combined portion to be extracted with dimethylformamide. None of the rubber substrate can be extracted with the usual rubber solvents.

EXAMPLE II.—PREPARATION OF SUB-BLENDS

Part A

Prepare Sub-blend A by mixing an aliquot of the graft copolymer latex of Example I with a latex of a styrene-acrylonitrile (80:20) copolymer having a specific viscosity of about 0.07 (measured as a solution of 0.1% of the polymer in dimethylformamide at 25° C.) in such proportions that the graft copolymer substrate constitutes 30% of the total polymer weight. Co-coagulate the polymers from the mixed latices and recover the coagulum.

Part B

Prepare Sub-blend B by repeating Part A except for mixing the latices in such proportions that the graft copolymer substrate constitutes 35% of the total polymer weight.

Part C

Prepare Sub-blend C by repeating Part A except for mixing the latices in such proportions that the graft copolymer substrate constitutes 40% of the total polymer weight.

EXAMPLE III.—PREPARATION OF POLYBLENDS—SERIES A

Prepare a series of polyblends by extrusion blending aliquots of Sub-blend A at 218° C. with varying amounts of a styrene-acrylonitrile (72:28) bead copolymer having a specific viscosity of about 0.1 (measured as a solution of 0.1% of the polymer in dimethylformamide at 25° C.) in such proportions that the graft copolymer substrate constitutes 10% of Polyblend A-1, 15% of Polyblend A-2, 20% of Polyblend A-3, 25% of Polyblend A-4, and 30% of Polyblend A-5 (Sub-blend A—no bead copolymer). Mold test specimens from the extruded stock at 205° C. The Izod impact strengths of the specimens (½" x ½" bars) at 23° C., as determined by ASTM test D-256-47T, are shown in Table I.

EXAMPLE IV.—PREPARATION OF POLYBLENDS—SERIES B

Prepare a series of polyblends by repeating Example III except for employing Sub-blend B instead of Sub-blend A. The graft copolymer substrate constitutes 10% of Polyblend B-1, 15% of Polyblend B-2, 20% of Polyblend B-3, 25% of Polyblend B-4, 30% of Polyblend B-5, and 35% of Polyblend B-6, (Sub-blend B—no bead copolymer). Impact strengths of ½" x ½" bars of the polyblends at 23° C. are shown in Table I.

EXAMPLE V.—PREPARATION OF POLYBLENDS—SERIES C

Prepare a series of polyblends by repeating Example III except for employing Sub-blend C instead of Sub-blend A. The graft copolymer substrate constitutes 10% of Polyblend C-1, 15% of Polyblend C-2, 20% of Polyblend C-3, 25% of Polyblend C-4, 30% of Polyblend C-5, 35% of Polyblend C-6, and 40% of Polyblend C-7 (Sub-blend C—no bead copolymer). Impact strengths of ½″ x ½″ bars of the polyblends at 23° C. are shown in Table I.

TABLE I

| Polyblend | Percent Substrate in Polyblend | Izod Impact Strength (ft. lbs./in. notch) |
| --- | --- | --- |
| A-1 | 10 | 1.7 |
| B-1 | 10 | 1.6 |
| C-1 | 10 | 1.3 |
| A-2 | 15 | 3.2 |
| B-2 | 15 | 3.3 |
| C-2 | 15 | 3.1 |
| A-3 | 20 | 4.2 |
| B-3 | 20 | 4.5 |
| C-3 | 20 | 4.3 |
| A-4 | 25 | 4.3 |
| B-4 | 25 | 4.9 |
| C-4 | 25 | 5.0 |
| A-5 | 30 | 3.7 |
| B-5 | 30 | 5.2 |
| C-5 | 30 | 5.3 |
| B-6 | 35 | 4.9 |
| C-6 | 35 | 5.4 |
| C-7 | 40 | 5.0 |

The above table demonstrates (1) that the optimum graft copolymer substrate concentration in the polyblends is dependent on the ratio of emulsion-polymerized styrene-acrylonitrile copolymer to suspension-polymerized styrene-acrylonitrile copolymer, (2) that the optimum ratio of these copolymers is dependent on the particular substrate concentration desired in the polyblend, (3) that in each of the three series of polyblends higher impact strengths can be obtained by using both emulsion-polymerized and suspension-polymerized styrene-acrylonitrile copolymers than by using only an emulsion-polymerized styrene-acrylonitrile copolymer, and (4) that the impact strengths of the polyblends of each of the three series begin to decrease with decreasing emulsion polymer/suspension polymer ratio after a maximum impact strength has been attained, indicating the undesirability of utilizing a suspension polymer as the sole styrene-acrylonitrile copolymer of the polyblends.

EXAMPLE VI.—PREPARATION OF POLYBLENDS—SERIES D

Coagulate the graft copolymer from an aliquot of the graft copolymer latex of Example I and recover the coagulum. Then prepare a series of polyblends by repeating Example III except for employing this coagulum instead of Sub-blend A. The graft copolymer substrate constitutes 10% of Polyblend D-1, 15% of Polyblend D-2, 20% of Polyblend D-3, 25% of Polyblend D-4, 30% of Polyblend D-5, and 35% of Polyblend D-6.

The Izod impact strength of each of the polyblends is less than the impact strengths of the corresponding polyblends of the A-C series in which the graft copolymer is blended with both an emulsion-polymerized copolymer and a suspension-polymerized polymer.

*Graft copolymer.*—The graft copolymers whose latices are mixed with latices of monovinylidene aromatic compound-unsaturated nitrile interpolymers in accordance with the present invention are monovinylidene aromatic compound-unsaturated nitrile superstrate/diene rubber substrate graft copolymers which have at least 80% of the superstrate chemically-combined with the substrate. These graft copolymers are prepared by polymerizing 15–90 parts by weight of a mixture of a monovinylidene aromatic compound and an unsaturated nitrile in an aqueous dispersion containing 100 parts by weight of the diene rubber which will form the substrate of the graft copolymer. The preferred graft copolymers of the invention are those prepared by polymerizing 30–70 parts of monomer mixture/100 parts of diene rubber, with optimum properties being obtained when 40–60 parts of monomer mixture are employed.

The graft copolymerization reaction is conducted with agitation at a temperature at which the initiator in the system initiates copolymerization of the monovinylidene aromatic compound and the unsaturated nitrile, usually a temperature of 40–100° C. Supplementary polymerization initiator may be added to the system to insure substantially complete conversion of the monomer charge to polymer, but this supplementary initiator is frequently unnecessary because of the ability of unconsumed initiator remaining from the preparation of the diene rubber and/or active sites on the chain of the diene rubber to initiate polymerization of the monomer charge.

The reaction is preferably conducted in the substantial absence of any emulsifying agent added to the preformed rubber latex because of the effect of added emulsifying agent in decreasing grafting efficiency. The emulsifying agent already present in the rubber latex is usually sufficient to act as a dispersing agent for the graft copolymerization reaction. If desired, however, up to about 2% of emulsifying agent, based on the weight of the monomer mixture can be added to the aqueous dispersion. The observance of this precaution with regard to added emulsifying agent permits the attainment of high grafting efficiency. As a result, the graft copolymers of the invention have at least 80% of the superstrate chemically-combined with the substrate. Since no unreacted rubber can be extracted from the graft copolymer, it appears that all of the diene rubber becomes chemically-combined with the superstrate.

Optional additives, such as chain transfer agents and stabilizers, can be included in the graft copolymerization reaction mixture when desired.

*Graft copolymer superstrate.*—The superstrate of the graft copolymer consists of 20–95%, preferably 65–80%, by weight of a chemically-combined monovinylidene aromatic compound and 80–5%, preferably 35–20%, by weight of a chemically-combined unsaturated nitrile. As mentioned above, at least 80% of this superstrate is chemically-combined with the substrate as grafted chains; ordinarily, at least a small amount of the superstrate is an interpolymer which is not chemically-combined with the substrate.

Unsaturated nitriles suitable for use in preparing the superstrate are acrylonitrile and/or methacrylonitrile. Suitable monovinylidene aromatic compounds are styrene, aralkylstyrenes (e.g., o-, m-, and p-methylstyrenes, 2,4-dimethylstyrene, p-ethylstyrene, etc.), ar-halostyrenes (e.g., o-, m-, and p-chlorostyrenes, 2,4-dichlorostyrene, 2-methyl-4-chlorostyrene, etc.), alpha-methylstyrene, and mixtures thereof. When alpha-methylstyrene is used as a monovinylidene aromatic component, it is usually employed in such amount as not to exceed 70% of the weight of the monomer charge in order to avoid having to remove unreacted monomers from the reaction mixture at the end of the reaction.

*Graft copolymer substrate.*—The substrate of the graft copolymer is a diene rubber which, as mentioned above, appears to be entirely chemically-combined with the superstrate. Suitable diene rubbers for use in preparing the graft copolymers are those rubbery polymers (i.e., polymers having a second order transition temperature not higher than about 0° C., preferably not higher than −20° C., as determined by ASTM test D–746–52T) which consist essentially of 85–100% by weight of chemically-combined butadiene and/or isoprene and 0–15% by weight of one or more chemically-combined copolymerizable monovinylidene monomers.

Ordinarily, in order that the polyblends of the invention may have optimum impact properties, the diene rubber should have a swelling index (i.e., ratio of solvent-swollen gel to dry gel) at least as high as 11 in benzene, as determined by (1) maintaining a mixture of 0.3 gram of the rubber and 75 ml. of benzene in total darkness for 24 hours at 20° C., (2) filtering the mixture through a 100 mesh stainless steel screen, (3) washing the benzene-insoluble portion of the rubber with 10 ml. of benzene and determining the weight of the insoluble, solvent-swollen polymer, (4) evaporating an aliquot of the filtrate to dryness to determine the weight of the benzene-soluble portion of the rubber, and (5) calculating the swelling index in accordance with the equation:

Swelling Index =
$$\frac{\text{Wt. in grams of benzene-swollen polymer}}{0.3 \text{ -wt. in grams of benzene-soluble polymer}}$$

According to a preferred embodiment of the invention, the diene rubber should have a swelling index of 11–20 in benzene in order to provide polyblends which exhibit an optimum balance of physical and surface properties. When the swelling index of the rubber employed as the graft copolymer substrate is less than 11, the polyblends are somewhat deficient in impact strength; when the swelling index is higher than 20, the polyblends have poorer surface properties and cannot be used in applications which have stringent surface property requirements.

As will be understood by those skilled in the art, a rubber having a desired swelling index can be provided by regulating the degree of conversion of the rubber and/or by including a chemical cross-linking agent in the monomer charge to achieve the degree of cross-linking necessary to provide the desired swelling index. The synthesis of a rubber substrate of the present invention is ordinarily carried to at least 80% conversion. A chemical cross-linking agent, when employed, is usually used in amounts not higher than about 1.5%, based on the weight of the rubber-forming monomers, to avoid reducing the swelling index to a level lower than 11. Cross-linking agent contents of 0.5–1.25% are particularly advantageous. Any cross-linking agent capable of reacting with the rubber-forming monomers to provide a swelling index of at least 11 in benzene can be used in the practice of the invention. Such cross-linking agents are, of course, already well known and include, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

The diene rubber can include up to 15% by weight of one or more chemically-combined monovinylidene monomers which are copolymerizable with the conjugated diene component of the rubber. Among the suitable comonomers are monovinylidene aromatic hydrocarbons (e.g., styrene, alpha-methylstyrene, o-, m-, and p-methylstyrenes, etc.), alkyl acrylates, (e.g., methyl acrylate, ethyl acrylate, butyl acrylate, octyl acrylate, etc.), the corresponding alkyl methacrylates, acrylonitrile, methacrylonitrile, and mixtures thereof. According to a preferred embodiment of the invention, the diene rubber consists essentially of about 85–95% by weight of chemically-combined butadine and/or isoprene and 15–5% by weight of one or more chemically-combined copolymerizable monovinylidine aromatic hydrocarbons, especially styrene.

In preparing the graft copolymers of the invention, the diene rubbers are usually employed in the form of freshly-prepared latices or latices which have been stored in an inert atmosphere. These latices can be prepared by any of the aqueous emulsion polymerization techniques conventionally utilized for the preparation of such latices. Generally, the monomers are emulsified in water with the aid of about 2–7%, based on the weight of the monomers, of a micelle-forming emulsifying agent and polymerized at 0–80° C. in the presence of a water-soluble free radical polymerization initiator or redox catalyst. The reaction mixture can, and usually does, also contain a chain transfer agent, e.g., a higher alkyl mercaptan such as dodecyl mercaptan.

*Emulsion interpolymer.*—The emulsion interpolymers whose latices are mixed with graft copolymer latices in accordance with the present invention consist of 20–95%, preferably 75–85%, by weight of a chemically-combined monovinylidene aromatic compound and 80–5%, preferably 25–15%, by weight of a chemically-combined unsaturated nitrile. Utilizable interpolymers have specific viscosities ranging from 0.04 to about 0.15, preferably from 0.04 to about 0.08, measured as a solution of 0.1% of the interpolymer in dimethylformamide at 25° C. The amount of emulsion-polymerized interpolymer mixed with the graft copolymer is such that the graft copolymer substrate constitutes 10–50%, preferably 30–40%, by weight of the sub-blend.

Monovinylidene aromatic compounds and unsaturated nitriles suitable for use in preparing the emulsion interpolymers are the same as those already listed as suitable for use in preparing the superstrate of the graft copolymer. The interpolymers can be prepared by any of the emulsion polymerization techniques conventionally employed for the preparation of such polymers, since any of these techniques leads to the formation of a polymer whose particle size in such that the product is a latex.

The sub-blend of graft copolymer and emulsion interpolymer can be recovered from the mixed latices in any suitable manner, e.g., spray-drying, drum-drying, coagulation, etc.

*Suspension interpolymer.*—The suspension, or bead, interpolymers which are blended with graft copolymer-emulsion interpolymer sub-blends in accordance with the present invention consist of 20–95%, preferably 60–75%, by weight of a chemically-combined monovinylidene aromatic compound and 80–5%, preferably 40–25%, by weight of a chemically-combined unsaturated nitrile. Utilizable interpolymers have specific viscosities ranging from about 0.04 to about 0.15, preferably from about 0.08 to about 0.15, measured as a solution of 0.1% of the polyber indimethylformamide at 25° C.

The amount of suspension-polymerized interpolymer blended with the sub-blend is such that the graft copolymer substrate constitutes a lesser percentage of the total blend than of the sub-blend, usually 5–40% and preferably 20–35% by weight of the total blend. Since the emulsion polymer/suspension polymer ratio and the graft copolymer substrate concentration are interdependent factors which determine the impact strengths of the polyblends, the optimum emulsion polymer/suspension polymer ratio varies considerably in the preparation of the polyblends of the invention. This optimum ratio is, of course, readily determinable by routine experimentation with polyblends having the desired graft copolymer substrate concentration. Ordinarly the emulsion polymer/suspension polymer weight ratio is between about 0.3:1 and 5:1.

Monovinylidene aromatic compounds and unsaturated nitriles suitable for use in preparing the suspension interpolymers are the same as those already listed as suitable for use in preparing the superstrate of the graft copolymer. The interpolymers can be prepared by any of the suspension polymerization techniques conventionally employed for the preparation of such polymers, since any of these techniques leads to the formation of a bead polymer.

The suspension interpolymer can be blended with the sub-blend in any suitable manner, preferably by extrusion blending or otherwise comalaxating the polymers at temperatures of about 190–260° C. It is frequently desirable to incorporate optional additives, such as plasticizers, stabilizers, etc., into the polyblends during this blending step. Such additives can, of course, be incorporated at another time if desired.

The products of the invention are blends of suspension-polymerized monovinylidene aromatic compound-unsaturated nitrile interpolymers and sub-blends of emulsion-polymerized monovinylidene aromatic compound-unsaturated nitrile interpolymers and monovinylidene aromatic compound-unsaturated nitrile superstrate/diene rubber substrate graft copolymers. These polyblends are particularly interesting in that they can have better impact properties than can be attained by blending the graft copolymers with either the emulsion polymers or the suspension polymers alone.

It is obvious that many variations can be made in the products and processes set forth above without departing from the spirit and scope of this invention.

What is claimed is:

1. A blend comprising (A) a suspension-polymerized monovinylidene aromatic compound-unsaturated nitrile interpolymer and (B) a sub-blend of (1) an emulsion-polymerized monovinylidene aromatic compound-unsaturated nitrile interpolymer and (2) a monovinylidene aromatic compound-unsaturated nitrile superstrate/diene rubber substrate graft copolymer containing 15–90 parts by weight of superstrate/100 parts by weight of substrate and having at least 80% of the superstrate chemically-combined with the substrate; said substrate being a rubbery polymer of 85–100% by weight of a conjugated diene of the group consisting of butadiene, isoprene, and mixtures thereof and up to 15% by weight of copolymerizable monovinylidene monomers; said graft copolymer superstrate and components A and B–1 each consisting essentially of 20–95% by weight of a chemically-combined monovinylidene aromatic compound of the group consisting of styrene, ar-halostyrenes, ar-alkyl-styrenes, alpha-methylstyrene, and mixtures thereof and 80–5% by weight of a chemically-combined unsaturated nitrile of the group consisting of acrylonitrile, methacrylonitrile, and mixtures thereof; the components of the blend being so proportioned that the graft copolymer substrate constitutes 10–50% of the weight of the sub-blend and a lesser percentage in the range of 5–40% of the weight of the total blend.

2. A blend as in claim 1 wherein the graft copolymer contains 30–70 parts by weight of superstrate/100 parts by weight of substrate.

3. A blend as in claim 1 wherein the graft copolymer contains 40–60 parts by weight of superstrate/100 parts by weight of substrate.

4. A blend as in claim 1 wherein the graft copolymer substrate in a rubbery polymer having a swelling index of 11–20 in benzene.

5. A blend as in claim 1 wherein (a) the suspension-polymerized interpolymer consists of 60–75% by weight of the chemically-combined monovinylidene aromatic compound and 40–25% by weight of the chemically-combined unsaturated nitrile and has a specific viscosity of 0.08–0.15 and (b) the emulsion-polymerized interpolymer consists of 75–85% by weight of the chemically-combined monovinylidene aromatic compound and 25–15% by weight of the chemically-combined unsaturated nitrile and has a specific viscosity of 0.04–0.08, both specific viscosities being measured as 0.1% solutions of the interpolymers in dimethylformamide at 25° C.

6. A blend as in claim 1 wherein the graft copolymer substrate constitutes 30–40% by weight of the sub-blend and a lesser percentage in the range of 20–35% by weight of the total blend.

7. A blend comprising (A) a suspension-polymerized styrene acrylonitrile copolymer having a combined styrene content of 60–75% by weight and a specific viscosity of 0.08–0.15 and (B) a sub-blend of (1) an emulsion-polymerized styrene-acrylonitrile copolymer having a combined styrene content of 75–85% by weight and a specific viscosity of 0.04–0.08 and (2) a styrene-acrylonitrile superstrate/butadiene-styrene rubber substrate graft copolymer containing 40–60 parts by weight of superstrate/100 parts by weight of substrate and having at least 80% of the superstrate chemically-combined with the substrate; said substrate being a rubbery polymer having a combined butadiene content of 85–95% by weight and a swelling index of 11–20 in benzene; said superstrate consisting essentially of 65–80% by weight of combined styrene and 35–20% by weight of combined acrylonitrile; the components of the blend being so proportioned that the graft copolymer substrate constitutes 30–40% of the weight of the sub-blend and a lesser percentage in the range of 20–35% of the weight of the total blend.

8. A process for preparing the blend of claim 1 which comprises mixing latices of the graft copolymer and the emulsion-polymerized interpolymer, co-coagulating the polymers from the mixed latices, recovering the coagulum, and comalaxating the coagulum at 190–260° C. with the suspension-polymerized interpolymer.

References Cited by the Examiner

UNITED STATES PATENTS

| | | | |
|---|---|---|---|
| 2,802,808 | 8/1957 | Hayes | 260—45 |
| 3,010,936 | 11/1961 | Irvin | 260—45 |
| 3,041,307 | 6/1962 | Baer | 260—876 |
| 3,073,798 | 1/1963 | Baer | 260—876 |
| 3,100,198 | 8/1963 | Fournet et al. | 260—876 |

OTHER REFERENCES

Schildknecht; Polymer Processes Interscience (1956).

MURRAY TILLMAN, *Primary Examiner.*

W. H. SHORT, *Examiner.*